United States Patent
Nordstrom et al.

(12)

(10) Patent No.: US 6,379,807 B1
(45) Date of Patent: Apr. 30, 2002

(54) COATING COMPOSITION HAVING IMPROVED ACID ETCH RESISTANCE

(75) Inventors: John D Nordstrom, Huntington Woods; Jun Lin, Troy, both of MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/707,573

(22) Filed: Nov. 7, 2000

(51) Int. Cl.$^7$ .............. B32B 9/04; C08L 43/04; C08F 8/30; C08G 77/04
(52) U.S. Cl. ............ 428/447; 428/423.1; 524/837; 524/853; 524/858; 525/123; 525/124; 525/127; 528/27; 528/28
(58) Field of Search .............. 428/447, 423.1; 524/837, 853, 858; 525/123, 124, 127; 528/27, 28

(56) References Cited

U.S. PATENT DOCUMENTS

| | | |
|---|---|---|
| 4,591,533 A | 5/1986 | Antonelli et al. |
| 4,632,964 A | 12/1986 | Altschuler et al. |
| 4,929,945 A | 5/1990 | Kushiyama |
| 5,066,698 A | 11/1991 | Hazan et al. |
| 5,532,027 A | 7/1996 | Nordstrom et al. |
| 5,684,084 A | 11/1997 | Lewin et al. |
| 5,891,981 A * | 4/1999 | Mauer et al. ........... 528/45 |
| 5,985,463 A * | 11/1999 | Lin et al. ........... 428/447 |
| 6,013,326 A | 1/2000 | Flosbach |

FOREIGN PATENT DOCUMENTS

| | | |
|---|---|---|
| EP | 0 135 741 | 4/1985 |
| EP | 0 708 159 | 4/1996 |
| WO | WO 00/55269 | 9/2000 |

OTHER PUBLICATIONS

Ntsihele et al. "Cross–Linked Coatings by Co–Reaction of Isocyanate–Methoxymethyl Melamine Systems", Journal of Applied Polymer Science, 55, Jan. 3, No. 1, New York, US, pp 153–161.

* cited by examiner

*Primary Examiner*—Michael J Feely
(74) *Attorney, Agent, or Firm*—Sudhir G. Deshmukh

(57) ABSTRACT

The present invention is directed to a coating composition particularly useful as a clear coating applied over a pigmented base coating, wherein the clear coating has improved resistance to marring and to acid etching when exposed to natural weathering conditions. The clear coating is particularly useful as an automotive OEM clear coating or as a refinish clear coating. The coating has two components. Component A of the coating composition includes a melamine and an acrylosilane polymer of a polymerized monomers mixture, which includes an alkyl methacrylate, an alkyl acrylate, cycloaliphatic alkyl methacrylate, cycloaliphatic alkyl acrylate, styrene or any mixture of these monomers; hydroxy alkyl methacrylate, hydroxy alkyl acrylate or any mixtures of these monomers; and a monoethylenically unsaturated silane monomer. Component B of the composition includes an organic polyisocyanate as a crosslinking agent.

14 Claims, No Drawings

US 6,379,807 B1

COATING COMPOSITION HAVING IMPROVED ACID ETCH RESISTANCE

BACKGROUND OF THE INVENTION

1. Field of the Invention

This invention is directed to coating compositions, in particular, to a high solids clear coating composition used as a clear coating applied over a base coating on a motor vehicle. The cured clear coating of the present invention has improved acid etch resistance in comparison to conventional clear coatings currently in use.

2. Description of the Prior Art

The finish of choice presently being used on the exterior of automobiles and trucks includes a clear coating applied over pigmented base coating. The clear coating provides protection to the pigmented base coating and improves the appearance of the overall finish, such as gloss and distinctness of image. Conventional clear coatings tend to have low acid etch resistance. Acid etching occurs when the clear coating is exposed to acid rain and other air pollutants.

Typically, the binder of a conventional clear coating composition contains crosslinking agents such as, a melamine component, as shown in EP 0 708 159 A2, EP 0 135 741 and DE 195 29 124 C 1. By increasing the amount of the melamine component, it generally reduces the acid etch resistance but does improve the mar resistance that also is an important property of a clear coating. Clear coatings compositions containing acrylosilane polymers have been used to improve mar and acid etch resistance are shown in Hazan et al U.S. Pat. No. 5,066,698 issued Nov. 19, 1991, Nordstrom et al U.S. Pat. No. 5,532,027 issued Jul. 2, 1996 and Lewin et al U.S. Pat. No. 5,684,084 issued Nov. 4, 1997. However, acrylosilane polymers significantly increase the cost of the clear coating compositions. To date, none of the clear coating compositions currently in use have the necessary balance of physical properties, in particular acid etch resistance, along with low cost desired for an automotive OEM (original equipment manufacturing) clear coating composition.

Thus, there is a need for an OEM clear coating composition for automobiles and trucks that will form finishes that are resistant to acid etching and water spotting caused by acid rain and has the desired costs.

SUMMARY OF THE INVENTION

A coating composition comprising 40% to 75% by weight of a film forming binder and 25% to 60% by weight of a volatile liquid carrier for the binder; all weight percentages are based on the total weight of the composition; wherein the binder comprises a. 20% to 70 % by weight, based on the weight of the binder solids, of an acrylosilane polymer of polymerized monomers from a monomer mixture comprising: an alkyl methacrylate, an alkyl acrylate, each having 1 to 12 carbon atoms in the alkyl group, cycloaliphatic alkyl methacrylate, cycloaliphatic alkyl acrylate, styrene or any mixture of these monomers; hydroxy containing monomers from the following group: hydroxy alkyl methacrylate, hydroxy alkyl acrylate each having 1 to 4 carbon atoms in the alkyl group, or any mixtures of these monomers; and a monoethylenically unsaturated silane monomer; wherein the polymer has a weight average molecular weight of 1,000 to 15,000 determined by gel permeation chromatography;

b. 10% to 60% by weight, based on the weight of the binder solids, of an organic polyisocyanate; and c. 5% to 40% by weight, based on the weight of the binder solids, of a melamine component.

DETAILED DESCRIPTION OF THE INVENTION

A typical auto or truck body is produced from a steel sheet or a plastic or a composite substrate. If steel is used, it is first treated with an inorganic rust-proofing compound, such as zinc or iron phosphate and then a primer coating is applied by electrodeposition. Typically, these electrodeposition primers are epoxy modified resins crosslinked with a polyisocyanate. Such electrodeposition primers are applied by a cathodic electrodeposition process. Optionally, a primer can be applied over the electrodeposited primer, usually by spraying, to provide better appearance and/or improved adhesion of the base coating to the primer. A pigmented base coating is then applied.

A typical pigmented base coating composition includes pigment, a film forming binder which can be a polyurethane, an acrylourethane, an acrylic polymer or a silane polymer, and a crosslinking agent such as, an aminoplast, an alkylated melamine formaldehyde crosslinking agent or a polyisocyanate crosslinking agent. The base coating composition can be solvent or water borne and can be in the form of a dispersion or a solution. Generally, pigments used in the base coating composition include metallic flake pigments, such as aluminum flake or pearl flake pigments.

Typically, a clear coating is then applied over the base coating before the base coating is fully cured, a so called wet on wet process, and the base coating and clear coating are then fully cured usually by baking at 100° C. to 150° C. for 45 to 15 minutes. The base coating and clear coating preferably have a dry coating thickness ranging from 2.5 to 75 microns and 25 to 100 microns, respectively.

The clear coat composition of this invention contains 40% to 75% by weight of a film forming binder and 25% to 60% by weight, based on the total weight of the composition, of a volatile organic liquid carrier, that usually is a solvent for the binder and volatilizes at 35° C. and above. The clear coating also can be in dispersion form. The film forming binder of the clear coating composition contains 20% to 70% by weight, preferably, 30% to 60% by weight and most preferably, 35% to50% by weight, of an acrylosilane polymer having reactive silane and hydroxyl groups; 10% to 60% by weight, preferably, 15% to 40% by weight and most preferably, 25% to 35% by weight, of an organic polyisocyanate crosslinking agent and 5% to 40% by weight, preferably, 10% to 35% by weight and most preferably, 15% to 30% by weight, of a melamine component. All the foregoing percentages are based on the total weight of the binder solids. Preferably, the ratio of isocyanate groups of the organic polyisocyanate to hydroxyl groups of the acrylosilane polymer ranges from 0.4:1 to 1.3:1.

The acrylosilane polymer comprises polymerized non-silane containing monomers of alkyl methacrylates, alkyl acrylate, each having 1 to 12 carbon atoms in the alkyl groups, cycloaliphatic alkyl methacrylate, cycloaliphatic alkyl acrylate, styrene or mixtures of any of the above monomers. The acrylosilane polymer also comprises polymerized hydroxy containing monomers such as hydroxy alkyl methacrylate, hydroxy alkyl acrylate, each having 1 to 4 carbon atoms in the alkyl group or a mixture of these monomers and one or more polymerized mono ethylenically unsaturated silane monomers. The acrylosilane polymer has a weight average molecular weight of 1,000 to 15,000 and preferably, 3,000 to 12,000.

All molecular weights disclosed herein are determined by gel permeation chromatography (GPC).

One preferred acrylosilane polymer is the polymerization product of 35% to 75% by weight of non silane containing monomers of an alkyl methacrylate, an alkyl acrylate each having 1 to 8 carbon atoms in the alkyl group, styrene or mixtures of these monomers; 20% to 40% by weight of hydroxy alkyl methacrylate having 1 to 4 carbon atoms in the alkyl group; and 5% to 25% by weight of a monoethylenically unsaturated silane containing monomer.

Typically useful ethylenically unsaturated non-silane containing monomers are alkyl acrylates, alkyl methacrylates where the alkyl groups have 1 to 12 carbon atoms such as methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate; methyl acrylate, ethyl acrylate, propyl acrylate, butyl acrylate, isobutyl acrylate, pentyl acrylate, hexyl acrylate, octyl acrylate, nonyl acrylate, and lauryl acrylate. Cycloaliphatic alkyl methacrylates and acrylates can also be used, for example, such as cyclohexyl methacrylate, cyclohexyl acrylate, trimethylcyclohexyl methacrylate, trimethylcyclohexyl acrylate, iso-butyl cyclohexyl methacrylate, t-butyl cyclohexyl acrylate, t-butyl cyclohexyl methacrylate, isobornyl methacrylate and isobornyl acrylate. Aryl acrylate and aryl methacrylates can also be used, for example, such as benzyl acrylate and benzyl methacrylate. Mixtures of two or more of the above mentioned monomers are useful in formulating the polymer with the desired characteristics.

In addition to alkyl acrylates or methacrylates, other non-silane containing polymerizable monomers in amounts up to 50% by weight of the polymer can be used in a silane polymer for the purpose of achieving the desired physical properties such as, hardness, appearance, and mar resistance. Exemplary of such other monomers are styrene, methyl styrene, acrylamide, acrylonitrile, and methacrylonitrile. Styrene can be used in the range of 0% to 50% by weight, based on the weight of the polymer.

Hydroxy functional monomers may be incorporated into the silane polymer to produce a polymer having a hydroxy number of 20 to 200, preferably 80 to 160 and more preferably, 120 to 150. Typically useful hydroxy functional monomers are hydroxy alkyl methacrylates and acrylates such as hydroxy ethyl methacrylate, hydroxy propyl methacrylate, hydroxy butyl methacrylates, hydroxy isobutyl methacrylate, hydroxy ethyl acrylate, hydroxy propyl acrylate, and hydroxy butyl acrylate.

Typical commercial hydroxy functional monomers can contain up to 1% by weight of acrylic or methacrylic acid. During polymerization, the acid can cause side reactions involving the silane monomers that broaden the molecular weight distribution of the acrylic polymer which will have harmful effects on solids content of the coating composition, stability of the coating composition and even cause gelation during copolymer preparation. Preferably the acid content of these hydroxy monomers should be limited to about 0.1% by weight.

A suitable silane containing monomer useful in forming an acrylosilane polymer is a silane having the following structural formula:

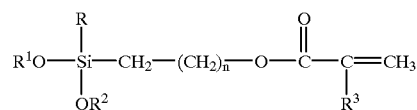

wherein R is either $CH_3$, $CH_3CH_2$, $CH_3O$, or $CH_3CH_2O$; $R^1$ and $R^2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such silanes are the acrylate alkoxy silanes, such as gamma acryloxypropyltrimethoxy silane and the methacrylatoalkoxy silanes, such as gamma-methacryloxypropyltrimethoxy silane or gamma trimethoxy silyl propyl methacrylate, and gamma trimethoxy silyl propyl acrylate, and gamma-methacryloxypropyltris(2-methoxyethoxy) silane.

Other suitable silane monomers have the following structural formula:

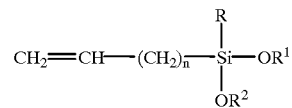

wherein R, $R^1$ and $R^2$ are as described above and n is 0 or a positive integer from 1 to 10.

Examples of such silanes are the vinylalkoxy silanes, such as vinyltrimethoxy silane, vinyltriethoxy silane and vinyltris (2-methoxyethoxy) silane.

Other useful silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Mixtures of the above-mentioned silane-containing monomers are also suitable.

Consistent with the above mentioned components of the acrylosilane polymer, the following is an example of an acrylosilane polymer useful in the coating composition of this invention that contains the following constituents: 15% to 30% by weight styrene, 30% to 50% by weight isobutyl methacrylate, 15% to 30% by weight hydroxy ethyl methacrylate, and 15% to 30% by weight of methacryloxypropyl trimethoxy silane. All of the above percentages are based on the weight of the acrylosilane polymer.

Typical polymerization catalysts used to form the acrylosilane polymer are azo type catalysts, such as azo-bis-isobutyronitrile, acetate catalysts, such as t-butyl peracetate, peroxide catalysts, such as di-t-butyl peroxide, benzoate catalysts, such as t-butyl perbenzoate, and octoate catalysts, such as t-butyl peroctoate.

Typical solvents that can be used to polymerize the monomers and to form the coating composition are ketones, such as methyl amyl ketone, isobutyl ketone, methyl ethyl ketone, aromatic hydrocarbons solvents, such as toluene, xylene, Solvesso® 100 aromatic solvent, ethers, esters, alcohols, acetates and mixtures of any of the above.

The coating composition can contain from 1% to 20% by weight, based on the weight of binder solids, of a polyester resin which is the esterification product of a dicarboxylic acid or anhydride, a polyol having at least three reactive hydroxyl groups, a diol, and a cyclic alcohol and having a number average molecular weight in the range of 500 to 4,000. One preferred polyester resin is the esterification product of adipic acid, trimethylol propane, hexanediol, hexahydrophathalic anhydride and cyclohexane dimethanol.

Also, the coating composition can contain from 1% to 20% by weight, based on the weight of binder solids, of an hydroxy functional acrylic resin (without silane functionality). Such resins are similar to the aforementioned acrylosilane resins but without the silane functionality.

Any of the conventional aromatic, aliphatic, cycloaliphatic, polyisocyanates, trifunctional isocyanates and isocyanate functional adducts of a polyol and a diisocyanate can be used in the novel coating composition of this invention. Typically useful diisocyanates are 1,6-hexamethylene diisocyanate, isophorone diisocyanate, 4,4'-bisphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene-diisocyanate, bis-(4-isocyanatocyclohexyl)-methane, and 4,4'-diisocyanatodiphenyl ether.

Typical trifunctional isocyanates that can be used are triphenylmethane triisocyanate, 1,3,5-benzene triisocyanate, and 2,4,6-toluene triisocyanate. Trimers of diisocyanates also can be used. These trimers may be biurets or isocyanurates. Examples are sold under the trade names of Desmodur® N3300 or Tolonate® HDT (products of Bayer Corporation, Pittsburgh, Pa.). These trimers also contain higher oligomers such as pentamers, heptamers, etc. that are generated during the process of preparing theses trimers.

One particularly useful isocyanurate is the isocyanurate of isophorone diisocyanate.

Isocyanate functional adducts that are formed from an organic polyisocyanate and a polyol can be used. Any of the aforementioned polyisocyanates can be used with a polyol to form an adduct. Polyols, such as trimethylol alkanes, particularly trimethylol propane or ethane can be used. One useful adduct is the reaction product of tetramethylxylidene diisocyanate and trimethylol propane and is sold as Cythane® 3160 by Cytec Industries Inc., West Patterson, N.J.

The melamine component used in the novel coating composition of this invention includes suitable monomeric or polymeric melamines or combinations thereof.

Alkoxy monomeric melamines that can be used are low molecular weight melamines that contain on an average three or more methylol groups reacted with a monohydric alcohol having 1 to 5 carbon atoms, such as methanol, propanol, n-butanol and isobutanol and has an average degree of condensation of less than 2 and preferably, in the range of about 1.1 to 1.8. Polymeric alkoxy melamines having a degree of condensation of 2 or more are also suitable.

Suitable monomeric melamines include highly alkylated melamines, such as methylated, butylated, isobutylated melamines and mixtures thereof. More particularly hexamethylol melamine, trimethylol melamine, partially methylated hexamethylol melamine and pentamethoxyl methyl melamine are preferred. Partially methylated and butylated melamines are more preferred.

Many suitable melamines are supplied commercially. For example, Cytec Industries Inc. West Patterson, N.J. supplies methylated melamines such as Cymel® 301 Cymel® 303, 325, 327, 350 and 370. Partially methylated and butylated melamine resins such as Cymel® 1168 are particularly useful. Polymeric melamines that can be used include high imino melamines, such as Resimine® BMP 5503 supplied by-Solutia Inc. St.; Louis, Mo., or Cymel® 1158, 1130, or 1133 supplied by Cytec Industries Inc.

Curing catalysts, are generally used in the coating composition in amounts of 0.1% to 5% by weight, based on the weight of the binder, for catalyzing the crosslinking of the acrylosilane polymer with the isocyanate moieties of the polyisocyanate and the melamine component. Preferred is a mixture of a blocked sulfonic acid catalyst and an alkyl or aryl acid phosphate catalyst, such as butyl acid phosphate or phenyl acid phosphate. Typical blocked acid catalyst are dodecyl benzene sulfonic acid blocked with an amine, such as amino methyl propanol or dimethyl oxazolidine. Blocked toluene sulfonic acid can also be used.

The coating composition is provided as a two component composition. In a typical two component composition, component A, which contains the acrylosilane polymer, melamine component, and blocked acid catalyst is mixed just before application of the coating composition with component B, which contains the polyisocyanate crosslinking agent and the acid phosphate catalyst. The mixture of components A and B is applied usually by conventional spraying or electrostatic spraying.

Other catalysts that can be used to improve the cure rate of the composition, include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catalyzing silane bonding. Other silane curing catalysts disclosed in U.S. Pat. No. 4,923,945, column 15 to column 17, are herein incorporated by reference.

To improve the weatherability of the clear coating, ultraviolet light stabilizers or a combination of ultraviolet light stabilizers can be added to the clear coat composition in the amount of 0.1% to 10% by weight, based on the weight of the binder. Such stabilizers include ultraviolet light absorbers, screeners, quenchers, and specified hindered amine light stabilizers. Also, an antioxidant can be added, in the amount 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of Tinuvin® 1130, 384 and 123 (hindered amine light stabilizers), all commercially available from Ciba Specialty Chemicals, Tarrytown, N.Y. is preferred.

The clear coating composition may also include other conventional formulation additives such as flow control agents, for example, such as Resiflow®S (polybutylacrylate), BYK® 320 and 325 (high molecular weight polyacrylates); and rheology control agents, such as fumed silica.

Conventional solvents and diluents described above are used to disperse or dilute the above mentioned polymers of the clear coating composition.

Typical base coating compositions used in combination with the clear coating composition, comprise as the film forming binder, a polyurethane, an acrylourethane, a silane resin, an acrylic resin or a polyester resin or mixtures of the aforementioned components and a crosslinking agent, such as a polyisocyanate or an alkylated melamine resin. The base coating composition can be waterborne or solvent based solution or dispersion. The base coating composition can contain conventional pigments including metallic flake pigments, such as aluminum flake.

Both the base coating composition and the clear coating composition can be applied by conventional techniques, such as spraying, electrostatic spraying, dipping, brushing, and flow coating.

Testing Procedures used in the Examples

20° Gloss—test method ASTM D523—a rating of at least 80 is an acceptable minimum.

DOI—distinctness of image—test method ASTM D5767—a rating of at least 80 is an acceptable minimum.

Hardness—Tukon Hardness—test method ASTM D1474.

Crockmeter—Dry Mar Resistance

The clear coating of the panel was coated with a thin layer of Bon Ami abrasive supplied by Faultless Starch/Bon Ami Corporation, Kansas City, Mo. The panels were then tested for mar damage by applying 10 double rubs against a green felt wrapped fingertip of A.A.T.C.C. Crockmeter (Model CM-1, Atlas Electric Devices Corporation, Chicago, Ill.). The dry mar resistance was recorded as percentage of gloss retention by measuring the 20° gloss of the mar areas versus the non-marred areas of the coated panels.

Crockmeter-Wet Mar Resistance

Similar procedure was used as above except that a wet alumina slurry was used instead of the Bon Ami abrasive. The alumina slurry consisted of 294 parts deionized water, 21 parts ASE-60® Thickner, 25 parts AMP 95% aqueous solution of amino methyl propanol and 7 parts of aluminum oxide (120# grit)

Acid Etch Resistance Test 10.16×30.48 cm (4×12 inches) primed steel panels coated with a black waterborne polyester modified acrylic melamine base coating were sprayed with a clear coating composition prepared in the Example and cured for 30 minutes at 140° C. The resulting panel was tested on a Byk Gradient oven, programmed with a temperature gradient that is 40° C. at the bottom of the gradient and 90° C. at the top of the gradient. 0.1 N sulfuric acid solution drops are placed on the panel at 5° C. intervals. The panels reside in the gradient oven for 30 minutes and then were rinsed with water. The degree of damage at each spot where the acid solution was dropped is evaluated vs. a control clear coating composition. The control clear coating composition is a two component commercial acrylic polyurethane. The performance of the clear coating under test is judged by the accumulated degree of damage that occurs over the entire gradient. The damage scale is 0–10 with 10 being the most damage. The commercial clear coating composition (control) has a degree of damage of 6 and any acceptable clear coating composition must have a degree of damage of 6 or less.

The following examples illustrate the invention. All parts and percentages are on a weight basis unless otherwise indicated. Molecular weights are determined by GPC (Gel Permeation Chromatography) using polymethyl methacrylate as the standard.

EXAMPLE 1

An acrylosilane polymer solution was first prepared and used to form Coating Composition I.

An acrylosilane polymer solution was prepared by copolymerizing in the presence of a 2/1 Solvesso® 100 Aromatic Solvent/butanol mixture, 20 parts by weight styrene (S), 31.5 parts by weight hydroxyethyl methacrylate (HEMA), 10 parts by weight methacryloxypropyl trimethoxy silane (MAPTS) and 25.9 parts by weight isobutyl methacrylate (IBMA) and 12.6 parts by weight of 2-ethylhexyl acrylate (2EHA)in the presence of 8 parts by weight of Vazo® 67 supplied by E.I. duPont de Nemours and Company. The resulting polymer solution had a 62% solids content and a viscosity of X-Y on the Gardner Holdt scale measured at 25° C. The polymer composition was 20%S/31.5%HEMA/ 10%MAPTS/25.9%IBMA/12.6%2EHA and had a weight average molecular weight of 4800.

A Coating Composition I was formulated by blending together the following ingredients:

| Portion A | Parts by Weight |
|---|---|
| Acrylosilane Polymer Solution (prepared above) | 141 |
| Acrylic hydroxy functional resin solution (66% solids in a 90/10 Solvesso ® 100 aromatic solvent/butyl acetate of an acrylic resin of styrene/butyl methacrylate/2-hydroxy ethyl acrylate having a weight average molecular weight of 5500) | 40 |
| Cymel ® 303 - hexamethoxy methylol melamine | 40 |
| Acrylic microgel resin (rheology control agent) | 6.5 |
| A mixture of UV and Hindered Amine Light Stabilizers (HALS) (19.7% Tinuvin ® 1130, 16.7% Tinuvin ® 384, 4.1% Tinuvin ® 123 and 14.7% Tinuvin ® 079 in 44.8% Solvesso ® 100 Aromatic Solvent) | 13.4 |
| Flow control additive Disparlon ® LC-955 (Vinyl polymer with silicone additive 10% solids in aromatic solvents from King Industries, Inc., Norwalk, Connecticut) | 2.2 |
| Dodecylbenzene Sulfonic Acid Solution (33% solids in methanol and blocked with amino methyl propanol) | 6.9 |
| Butanol | 1.1 |
| Solvesso ® 100 Aromatic Solvent | 26 |
| Ethyl 3-ethoxy propionate | 20 |
| Total | 297.1 |

Portion A was charged into a mixing vessel and diluted to a 35 seconds viscosity measured on a #2 Fisher cup with ethyl 3-ethoxy propionate solvent.

Portion B was prepared by mixing 100 parts of a hexamethylene diisocyanate trimer solution (72% solids Desmodur® 3300 in a 50/35/15 by weight mixture of n-butanol, xylene and aromatic hydrocarbon solvent) with 1 part pheny acid phosphate.

Coating Composition I was prepared by mixing 3 parts of Portion A with 1 part of Portion B and diluted to a spray viscosity of 35 seconds measured on a #2 Fisher with ethyl 3-ethoxy propionate solvent.

Steel panels electrocoated with a conventional primer were spray coated with a black waterborne polyester modified acrylic melamine base coating composition and after a 10 minute wait were prebaked for 10 minutes at 83° C. and then the above prepared clear Coating Composition I was sprayed on to provide a 50 micron thick film (dry film thickness) when cured and then the panels were baked at 140° C. for 30 minutes to form a base coat/clear coat coating having a Tukon Hardness of 13.3 knoop units, a 20°0 gloss of 89, a DOI—distinctness of image of 96, Crockmeter gloss retention under dry conditions of 90% and 90% under wet conditions (100% gloss retention—no damage by the test).

EXAMPLE 2

Coating Composition II was prepared in accordance with the process described above in Example 1 for Coating Composition I except that in Portion A Cymel® 1168 which is a partially methylated and butylated melamine resin at 100% solids was substituted for the Cymel® 303 melamine resin.

Electrocoated steel panels having a base coating as described in Example 1 were spray coated and baked as in Example 1 to form a base coat/ clear coat coating having a Tukon Hardness of 14.8 knoop units, a 20° gloss of 90, a DOI—distinctness of image of 97, crockmeter gloss retention of 84% under dry conditions and 80% under wet conditions.

COMPARATIVE EXAMPLE 3

This was a comparative example in which the auxiliary melamine crosslinking resin was omitted from the coating composition.

Comparative Coating Composition III was formulated by blending together the following ingredients:

| Portion A | Parts by Weight |
|---|---|
| Acrylosilane Polymer Solution (prepared in Example 1) | 112.9 |
| Acrylic hydroxy functional resin solution (described in Example 1) | 44.8 |
| Acrylic microgel resin (rheology control agent) | 6.0 |
| Mixture of UV and Hindered Amine Light Stabilizers (HALS) (described in Example 1) | 8.5 |
| Flow control additive Disparlon® LC-955 (described in Example 1) | 1.8 |
| Dodecylbenzene Sulfonic Acid Solution (described in Example 1) | 4.2 |
| Solvesso® 100 Aromatic Solvent | 25 |
| Ethyl 3-ethoxy propionate | 20 |
| Total | 223.2 |

Portion A was charged into a mixing vessel and diluted to a 35 seconds viscosity measured on a #2 Fisher cup with ethyl 3-ethoxy propionate solvent.

Portion B was prepared by mixing 76 parts of a hexamethylene diisocyanate trimer solution (72% solids Desmodur® 3300 in a 50/35/15 by weight mixture of n-butanol, xylene and aromatic hydrocarbon solvent) with 0.9 parts phenyl pheny acid phosphate.

Comparative Coating Composition III was prepared by mixing Portion A with Portion B and was diluted to a spray viscosity-of 35 seconds measured on a #2 Fisher with ethyl 3-ethoxy propionate solvent.

Steel panels electrocoated with a conventional primer were spray coated with a black waterborne polyester modified acrylic melamine base coating composition and after a 10 minute wait were prebaked for 10 minutes at 83° C. and then the above prepared clear Comparative Coating Composition III was sprayed on to provide a 50 micron thick film (dry film thickness) when cured and then the panels were baked at 140° C. for 30 minutes to form a base coat/clear coat coating having a Tukon Hardness of 12 knoop units, a 20° gloss of 90, a DOI—distinctness of image of 97, Crockmeter gloss retention under dry conditions of 80% and 75/o under wet conditions (100% gloss retention—no damage by the test).

Crockmeter gloss retention of Comparative Coating Composition III was significantly less than Coating Composition I (the invention) which had Crockmeter gloss retention of 90% both in the dry and wet tests in comparison to the 80% (dry) and 75% (wet) gloss retention of Comparative Coating Composition III that did not contain the melamine auxiliary crosslinking resin.

COMPARATIVE EXAMPLE 4

This was a comparative example in which the Acrylosilane Polymer Solution was omitted from the coating composition.

Comparative Coating Composition IV was formulated by blending together the following ingredients:

| | Parts by Weight |
|---|---|
| Portion A | |
| Cymel ® 303 (described in Example 1) | 40.0 |
| Acrylic microgel resin (rheology control agent) | 6.5 |
| Mixture of UV and Hindered Amine Light Stabilizers (HALS) (described in Example 1) | 13.4 |
| Flow control additive Disparlon ® LC-955 (described in Example 1) | 2.2 |
| Butanol | 1.1 |
| Dodecylbenzene Sulfonic Acid Solution (described in Example 1) | 6.9 |
| Solvesso ® 100 Aromatic Solvent | 20.0 |
| Ethyl 3-ethoxy propionate | 10 |
| Portion B | |
| Hexamethylene diisocyanate trimer solution (described in Example 1) | 90.0 |
| Phenyl acid phosphate | 0.6 |

Comparative Coating Composition IV was prepared by mixing Portion A with Portion B and was diluted to a spray viscosity of 35 seconds measured on a #2 Fisher with ethyl 3-ethoxy propionate solvent.

Three sets of steel panels electrocoated with a conventional primer were spray coated with a black waterborne polyester modified acrylic melamine base coating composition and after a 10 minute wait were prebaked for 10 minutes at 83° C. and then the above prepared clear Comparative Coating Composition IV was sprayed onto one set of panels to provide a 50 micron thick film (dry film thickness) when cured and then the panels were baked at 140° C. for 30 minutes to form a base coat/clear coat coating. A second set of panels was sprayed with the Coating Composition I of Example 1 and baked as above and a third set of panels was sprayed with the Comparative Coating Composition III of Example 3 and baked as above. Each of the panels was tested for Appearance, Tukon Hardness, Crockmeter—Wet Mar Resistance and Acid Etch Resistance. The results of these tests are shown in the following table:

TABLE

| Property | Example 1 Coating Composition I | Example 3 Comparative Coating Composition III | Example 4 Comparative Coating Composition IV |
|---|---|---|---|
| Appearance | Smooth, glossy | Smooth, glossy | Heavy Orange Peel |
| Tukon Hardness | 17 knoop units | 14 knoop units | 21 knoop units |
| Crockmeter- Wet Mar Resistance % Gloss Retention | 87 | 70 | 99 |
| Acid Etch Resistance | 3 | 3 | 6 |

Summary of the Above Results

The Coating Composition I (the invention) had the best balance of properties of the three compositions. It had a good appearance, and good mar and acid etch resistance. Comparative Coating Composition III which did not contain the auxiliary melamine crosslinking resin and is essentially the same as a commercial two component clear coating compositions was deficient in mar resistance. Comparative Coating Composition IV that did not contain the acrylosilane polymer was deficient in appearance and acid etch resistance.

What is claimed is:

1. A coating composition comprising 40% to 75% by weight of film forming binder and 25% to 60% by weight of a volatile liquid carrier for the binder; wherein the binder comprises
   a. 20% to 70% by weight, based on the weight of the binder solids, of an acrylosilane polymer comprising polymerized monomers selected from the group consisting of an alkyl methacrylate, an alkyl acrylate, each having 1 to 12 carbon atoms in the alkyl group, cycloaliphatic alkyl methacrylate, cycloaliphatic alkyl acrylate, styrene or any mixture of these monomers; hydroxy containing monomers selected from the group consisting of: hydroxy alkyl methacrylate, hydroxy alkyl acrylate each having 1 to 4 carbon atoms in the alkyl group, or any mixtures of these monomers; and a mono-ethylenically unsaturated silane monomer; and wherein the polymer has a weight average molecular weight of 1,000 to 15,000 determined by gel permeation chromatography;
   b. 10% to 60% by weight, based on the weight of the binder solids, of an organic polyisocyanate; and
   c. 5% to 40% by weight, based on the weight of the binder solids, of a melamine component.

2. The coating composition of claim 1 in which the mono-ethylenically unsaturated silane monomer has the following structural formula:

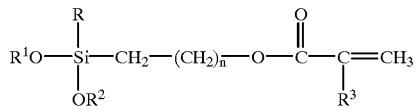

wherein:
   R is selected from the group consisting of $CH_3$, $CH_3CH_2$, $CH_3O$ and $CH_3CH_2O$;
   $R^1$ and $R^2$ are independently selected from the group consisting of $CH_3$ and $CH_3CH_2$; and
   $R^3$ is selected from the group consisting of H, $CH_3$, and $CH_3CH_2$ and n is 0 or a positive integer of 1 to 10.

3. The coating composition of claim 1 in which the melamine component is an alkylated melamine.

4. The coating composition of claim 2 in which the silane monomer is selected from the group consisting of gamma trimethoxy silyl propyl methacrylate and gamma trimethoxy silyl propyl acrylate, and the melamine component is a monomeric hexamethoxy methylol melamine.

5. The coating composition of claim 4 in which the acrylosilane polymer consists essentially of 35% to 75% by weight, based on the weight of the acrylosilane polymer, of polymerized monomers selected from the group consisting of alkyl acrylates, alkyl methacrylates each having 1 to 8 carbon atoms in the alkyl group, styrene and any mixtures thereof, 20% to 40% by weight, based on the weight of the acrylosilane polymer, of polymerized monomers selected from the group consisting of hydroxy alkyl methacrylates and hydroxy alkyl acrylates each having 1 to 4 carbon atoms in the alkyl groups, and 5% to 25% by weight, based on the weight of the acrylosilane polymer, of the mono ethylenically unsaturated silane monomer.

6. The coating composition of claim 5 in which the organic polyisocyanate is a trimer of hexamethylene diisocyanate or the trimer of isophorone diisocyanate.

7. The coating composition of claim 6 comprises 0.1 to 5% weight, based on the weight of the binder, of a mixture of a blocked sulfonic acid catalyst, an aryl or alkyl acid phosphate.

8. The coating composition of claim 7 in which the blocked sulfonic acid catalyst is a blocked dodecyl benzene sulfonic acid and the aryl acid phosphate is phenyl acid phosphate.

9. The coating composition of claim 1 which contains about 0.1% to 10% by weight, based on the weight of the binder, of ultraviolet light absorbers and optionally, hindered amine light stabilizers.

10. The coating composition of claim 1 in which the acrylosilane polymer consists essentially of 35% to 75% by weight, based on the weight of the acrylosilane polymer, of polymerized monomers selected from the group consisting of alkyl acrylates, alkyl methacrylates each having 1 to 8 carbon atoms in the alkyl group, styrene and any mixtures thereof, 20% to 40% by weight, based on the weight of the acrylosilane polymer, of polymerized monomers selected from the group consisting of hydroxy alkyl methacrylates and hydroxy alkyl acrylates each having 1 to 4 carbon atoms in the alkyl groups and 5% to 25% by weight, of the mono ethylenically unsaturated silane monomer; and
   the organic polyisocyanate is a trimer selected from the group consisting of hexamethylene diisocyanate or the trimer of isophorone diisocyanate;
   the melamine component is hexamethoxy methylol melamine; and
   the coating composition contains 0.1% to 5% weight, based on the weight of the binder solids, of a mixture of catalysts of a blocked sulfonic acid catalyst and aryl or alkyl acid phosphate.

11. A substrate having a base coating of a pigmented coating composition, which is topcoated with the coating composition of claim 1.

12. A two component coating composition comprising
   Component A comprising an acrylosilane polymer consisting essentially of 35% to 75% by weight, based on the weight of the acrylosilane polymer of polymerized monomers selected from the group consisting of alkyl acrylates, alkyl methacrylates each having 1 to 8 carbon atoms in the alkyl group and styrene, 20% to 40% by weight, based on the weight of the acrylosilane polymer of polymerized monomers selected from the group consisting of hydroxy alkyl methacrylates and hydroxy alkyl acrylates each having 1 to 4 carbon atoms in the alkyl groups, and 5% to 25% by weight, based on the weight of the acrylosilane polymer, of the mono ethylenically unsaturated silane monomer, a monomeric alkylated melamine and 0.1% to 2% by weight, based the weight of component A, of a blocked dodecyl benzene sulfonic acid and
   Component B consisting of an organic polyisocyanate and 0.1% to 2% by weight, based on the weight of Component B, of an aryl acid phosphate catalyst.

13. A process for forming a coating composition which comprises thoroughly blending Component A and Component B together before application of the coating composition and then applying the coating composition to a substrate and curing the coating composition;

wherein Component A comprises an acrylosilane polymer consisting essentially of 35% to 75% by weight, based on the weight of the acrylosilane polymer of polymerized monomers selected from the group consisting of alkyl acrylates, alkyl methacrylates each having 1 to 8 carbon atoms in the alkyl group and styrene, 20% to 40% by weight, based on the weight of the acrylosilane polymer of polymerized monomers selected from the group consisting of hydroxy alkyl methacrylates and hydroxy alkyl acrylates each having 1 to 4 carbon atoms in the alkyl groups, and 5% to 25% by weight, based on the weight of the acrylosilane polymer, of the mono ethylenically unsaturated silane monomer, a monomeric alkylated melamine and 0.1% to 2% by weight, based the weight of Component A, of a blocked dodecyl benzene sulfonic acid and Component B consisting of an organic polyisocyanate and 0.1% to 2% by weight, based on the weight of Component B, of an aryl acid phosphate catalyst.

14. The process of claim 13 in which the substrate has a base coating of a pigmented coating composition.

* * * * *